J. A. PETRO.
ANIMAL TRAP.
APPLICATION FILED JULY 13, 1908.
947,560.
Patented Jan. 25, 1910.
3 SHEETS—SHEET 1.
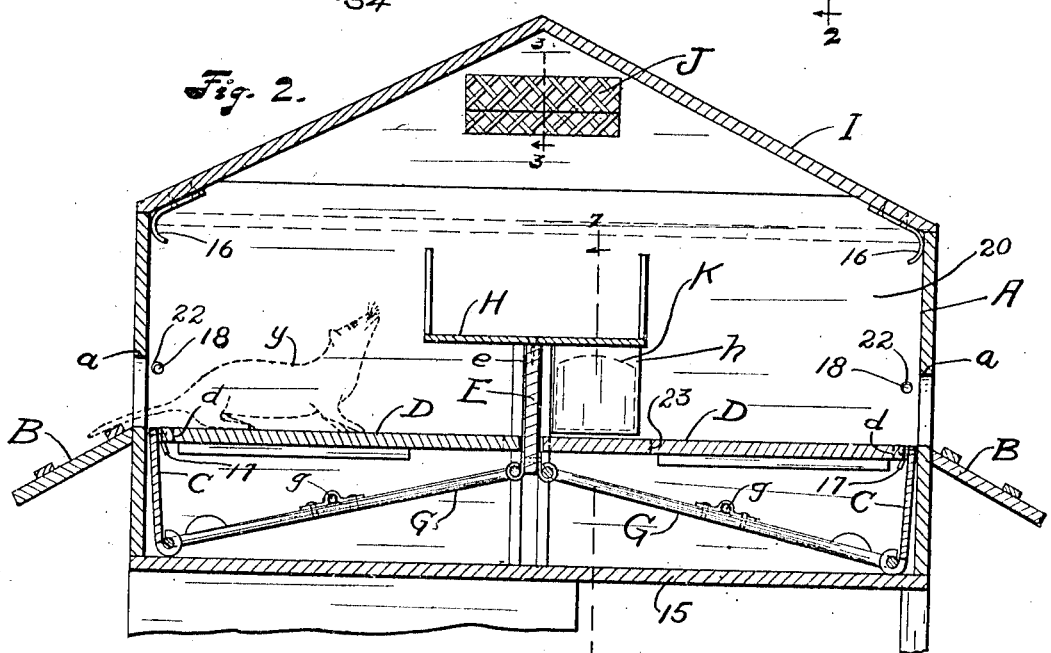

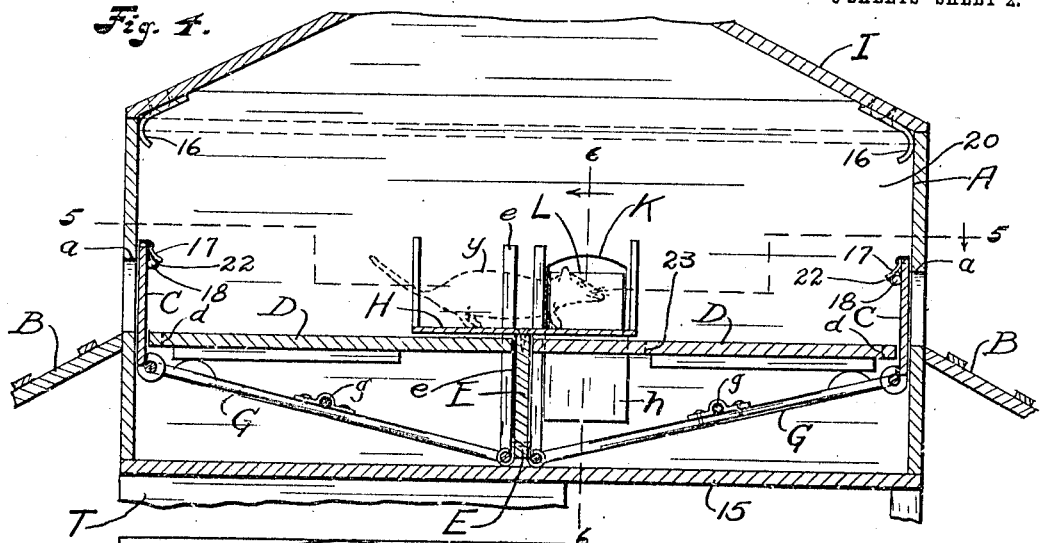
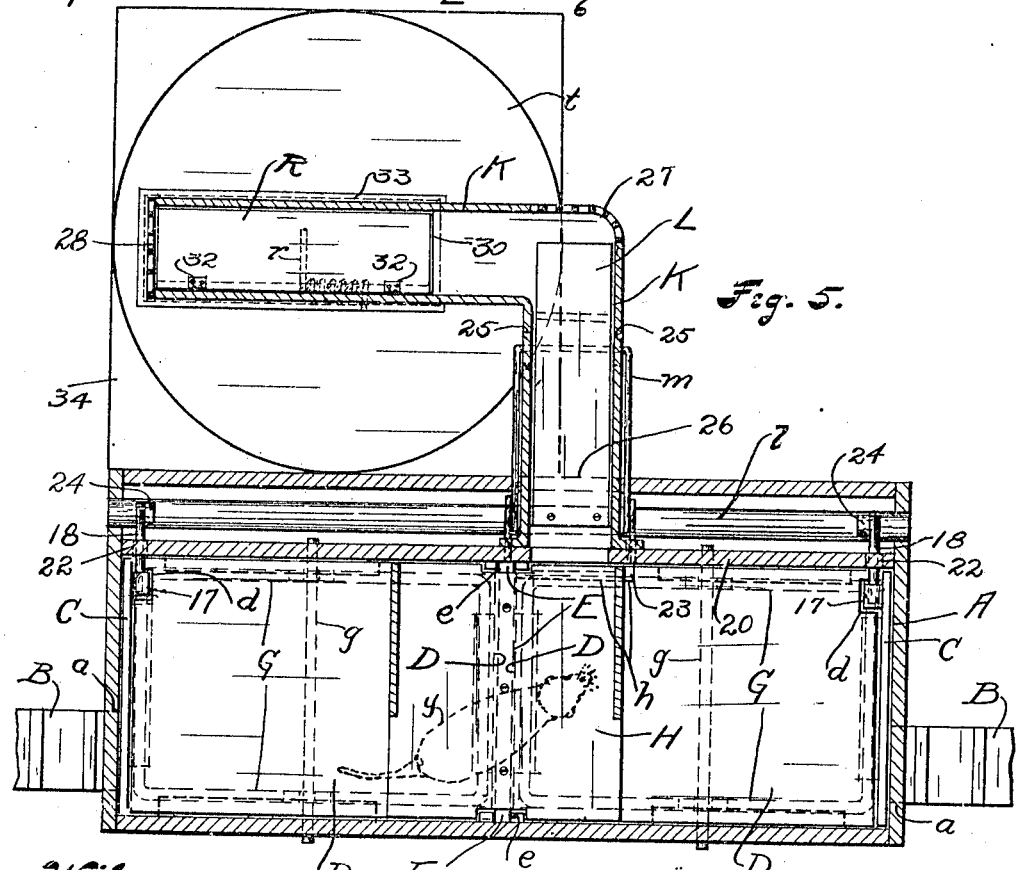

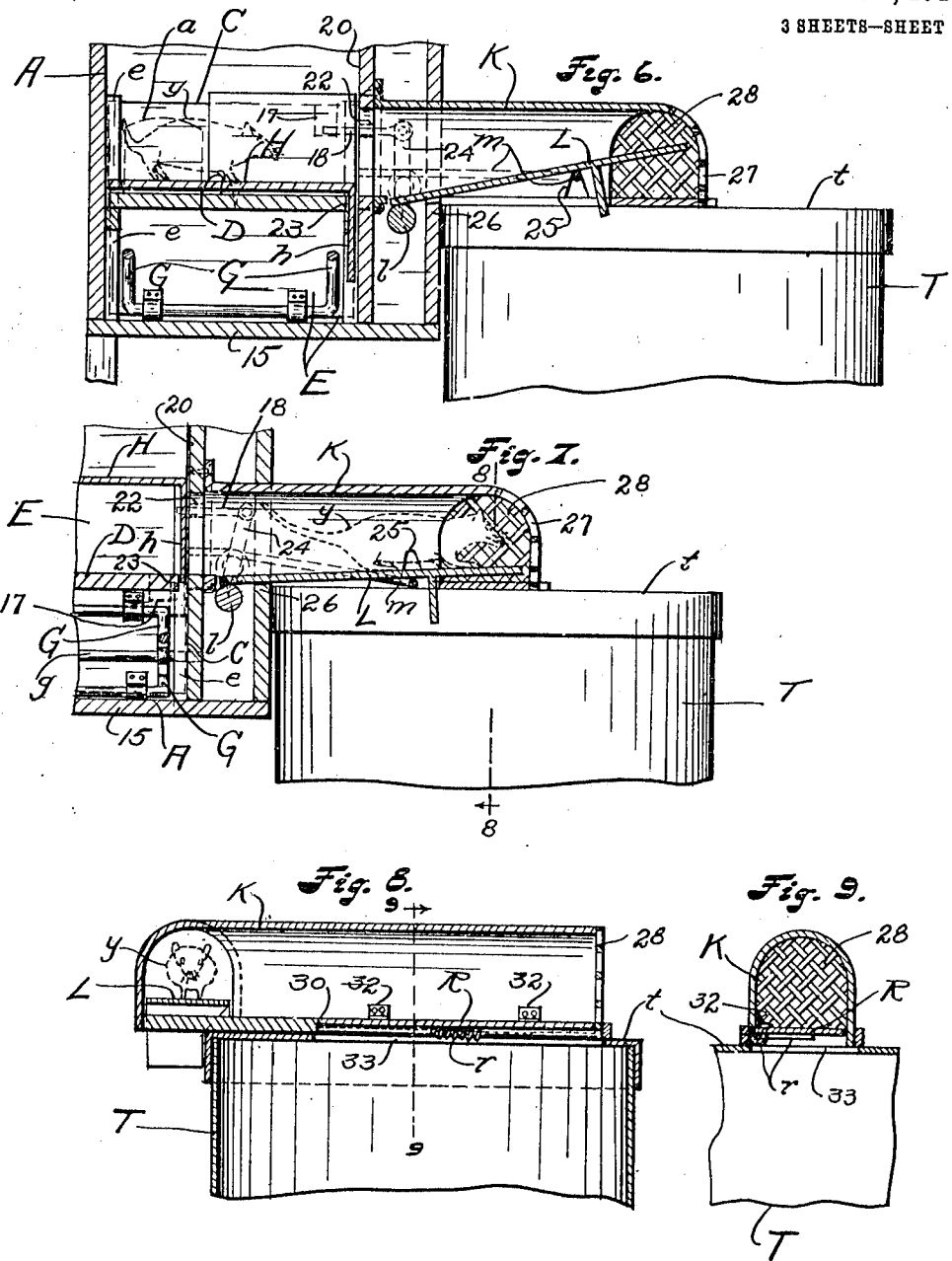

UNITED STATES PATENT OFFICE.

JOHN A. PETRO, OF LORAIN, OHIO.

ANIMAL-TRAP.

947,560.

Specification of Letters Patent.   Patented Jan. 25, 1910.

Application filed July 13, 1908.   Serial No. 443,201.

*To all whom it may concern:*

Be it known that I, JOHN A. PETRO, a citizen of the United States of America, residing at Lorain, in the county of Lorain and State of Ohio, have invented certain new and useful Improvements in Animal-Traps; and I hereby declare the following to be a full, clear, and exact description of the invention, such as will enable others skilled in the art to which it pertains to make and use the same.

This invention relates to improvements in animal-traps more especially suitable for use in entrapping rats.

One object of this invention is to provide an animal-trap having a chamber which has a doorway leading thereto and adapted to be closed by a door which is normally open but movable into position to close the doorway and actuated into its closed position by the descent of a vertically movable platform arranged within the chamber a suitable distance from the doorway and normally in its upper position and depressible by the weight of the animal to be entrapped.

Another object is to provide the trap with a food-holder arranged to hold food accessible to the animal to be entrapped from the aforesaid platform.

Another object is to provide means whereby the door is locked upon the actuation of the door into its closed position.

Another object is to have the said door normally arranged below the doorway and movable upwardly to close the doorway and to provide a stationary platform extending under the travel of the aforesaid movable platform from the lower end of the doorway and to have the mechanism, which operatively connects the door with the said movable platform, arranged out of the way below the stationary platform and operating to lift and thereby close the door during the descent of the movable platform.

Another object is to provide a passageway arranged to lead from the said vertically movable platform in the lower position of the platform and forming an outlet for the aforesaid chamber, and to have the means instrumental in locking the aforesaid door in its closed position upon the descent of the said platform rendered inoperative during the passage of the entrapped animal through the said passageway.

Another object is to provide a door which is borne by the said vertically movable platform and closes the receiving end of or is arranged below the aforesaid passageway according as the said platform is in its upper or lower position.

Another object is to provide the aforesaid passageway at the bottom with an outlet which discharges downwardly into a receptacle and has communication therethrough normally obstructed by a trap-door arranged to be opened downwardly by the weight of the animal against the action of means acting to retain the trap-door in its closed position.

Another object is to so apply and construct the receptacle that it is conveniently removable and readily cleanable.

Another object is to produce an animal-trap which is simple in construction, reliable in its operation and not liable to get out of order.

With these objects in view, and to the end of realizing any other advantages hereinafter appearing, this invention consists in certain features of construction, and combinations of parts, hereinafter described, pointed out in the claims, and illustrated in the accompanying drawings.

In the said drawings, Figure 1 is a side elevation of an animal-trap embodying my invention. Portions are broken away and in section in this figure to more clearly show the construction. Fig. 2 is a vertical section on line 2—2, Fig. 1, looking in the direction indicated by the arrow. Fig. 3 is a vertical section in detail on line 3—3, Fig. 2, looking in the direction indicated by the arrow. Fig. 4 is a vertical section corresponding with Fig. 2 except that Fig. 4 shows the platform H in its lower position and the door h and the doors C in their open and closed positions respectively, whereas Fig. 2 shows the said platform in its upper and normal position and the doors h and C in their closed and open position respectively. Fig. 5 is a horizontal section on line 5—5. Fig. 4, looking downwardly. Fig. 6 is a vertical section on line 6—6, Fig. 4, looking in the direction indicated by the arrow. Fig. 7 is a vertical section on line 7—7, Fig. 2, looking in the direction indicated by the arrow. Fig. 8 is a vertical section on line 8—8, Fig. 7. Fig. 9 is a vertical section on line 9—9, Fig. 8, looking in the direction indicated by the arrow.

My improved animal-trap comprises a chamber A which is provided with two doorways a and a formed in opposite walls respectively of the said chamber, which doorways afford passage into the said chamber from inclined ladders B and B which lead to the bottoms of the said doorways from the exterior of the trap. Each doorway a is adapted to be closed at its inner side by a vertically movable door C which is arranged within the chamber A and normally open and below the said doorway. Obviously therefore the doorways a are arranged far enough above the bottom 15 of the chamber A to accommodate the location and operation of the doors C which are movable upwardly as already indicated to close the said doorways.

Two stationary platforms D and D are arranged horizontally within the chamber A adjacent the bottom or lower end of opposite doorways a respectively and are arranged between the central portion of the said chamber and the doors for closing the said doorways. The platforms D are arranged far enough apart at their adjacent ends to accommodate the location and operation between them of a vertically movable slide E which engages correspondingly arranged slideways e formed in any approved manner. Each platform D is arranged far enough above the bottom 15 of the chamber A to accommodate the location between the said platform and the said bottom of a lever-forming vertically tilting frame G which establishes operative connection between the slide E and the door employed in closing the doorway affording access to the said platform. Each frame G is preferably journaled on a suitably supported axle $g$ which is arranged horizontally and transversely of the chamber A. The slide E, at its upper end, bears a horizontally arranged platform H, and the chamber A is closed at the top by a cover I which is provided internally and above the said platform with a rack J for holding peanuts or other food employed in alluring the animal to be entrapped. The cover I is removable, being provided at its under side with springs 16 which in the closed position of the cover frictionally engage the inner surfaces of the doorway-containing walls of the chamber A.

Fig. 2 shows an animal $y$ to be entrapped in position to jump from one of the stationary platforms D onto the movable platform H. The movable platform H is normally in its upper position, as shown in Fig. 2, and the slide E normally projects far enough above the stationary platforms to cause the weight of an animal jumping onto the said movable platform to depress the latter and connected slide E far enough to tilt the frames or levers G in the direction and to the extent required to elevate the doors C and thereby close the doorways a as shown in Fig. 4, but the said doors are heavy enough to enable them to operate as means acting to retain the said movable platform in its upper and normal position but not heavy enough to prevent the lowering of the said platform by the weight of the animal. It is obvious therefore that as soon as the animal $y$ to be entrapped has jumped onto the platform H as shown in Fig. 4, the escape of the said animal at the doorways a is prevented. Each door is provided at its inner side and upper end with a spring-catch which consists preferably of a spring or resilient member 17 attached to the said door in any approved manner and projecting downwardly and inwardly from the said side of the door, and the platform D adjacent the path of the said door is provided with a recess $d$ arranged to accommodate the location of the said spring-catch during the movement of the door from the one to the other of its positions.

A suitably supported endwise shiftable pin 18 projects into the chamber A adjacent the upper end of each doorway $a$ at the inner side of the path of the door adapted to close the said doorway and has such arrangement relative to the resilient member 17 of the said door that the said resilient member during the ascent of the door into its doorway-closing position is pressed toward the door by the said pin until the door has been moved into its upper position when the said resilient member assumes its normal position and overlaps the upper side of the said pin and thereby in conjunction with the pin operates to lock the said door in its upper and closed position. Preferably the pins 18 extend loosely through holes 22 formed in the upright wall 20 of the chamber A and are arranged substantially parallel with the axes of the levers G and have bearing on the bottoms of said holes. The chamber A has however an outlet through which an animal that has jumped upon the movable platform H may escape from the said chamber, which outlet is formed by an angular passageway K leading from the said platform in the lower position of the platform. The movable platform H is provided, at one side of the slide E and adjacent one of the slideways for the said slide, with a depending plate or member $h$ which forms a door closing the receiving end of the passageway K in the upper and normal position of the said platform, and the adjacent stationary platform is recessed or cut away, as at 23, to accommodate the descent of the said door during the descent of the movable platform. It will be observed therefore that the door $h$ is operatively connected with the platform H, which door closes the inner end of the passageway K in the upper position of the said platform and is open in the lower position of the said platform.

Within the passageway K is a tilting platform L which is arranged longitudinally of the passageway and normally extends from the receiving end of the passageway at the bottom of the passageway upwardly and outwardly. The tilting platform L is suitably secured at its inner and lower end to a suitably supported oscillating shaft *l* which is arranged externally of the chamber A and below and transversely of the passageway K and preferably horizontally and at a right angle to the axes of the levers G. The shaft *l* is provided at each end with an upwardly projecting arm 24 to which the pins 18 are operatively connected in any approved manner. A suitably applied spring *m* engages the under side of the platform L and acts to retain the said platform in its upper and normal position, and the side walls of the passageway K are slotted, as at 25, to accommodate the location of the said spring. Of course, the spring *m* is not powerful enough to retain the platform L in its normal position when the said platform is mounted by the entrapped animal. The entrapped animal *y*, upon mounting the platform L, by its weight depresses the said platform as shown in Fig. 7 against the action of the spring *m*, and the arrangement of the parts is such that the depression of the said platform by the animal oscillates the shaft *l* in the direction and to the extent required to actuate the pins 18 from under the resilient members 17 of the doors C so as to render the means instrumental in locking the said doors upon their actuation into their closed position inoperative and permit the return of the platform H into its upper and normal position to close the door *h*, as shown in Fig. 7, and to open the doors C.

My improved trap comprises a suitably formed stop-forming member 26 arranged under the platform L, as shown in Figs. 6 and 7, and in position to limit the depression of the said platform by the animal.

The passageway K is provided at the outer end of the platform L with a ventilator 27 which is arranged centrally between the ends of the said passageway. The passageway K is provided at its outer end with another ventilator 28, and between the two ventilators 27 and 28 has an outlet for permitting the escape of the entrapped animal from the passageway, which outlet is formed by an opening 30 in the bottom of the said passageway as shown in Fig. 8, which opening is normally closed by a suitably supported hinged trap-door R which is arranged to swing downwardly and prevented from moving upwardly by suitably applied stop-forming members 32. A suitably applied spring *r* engages the under side of the trap-door R and acts to retain the trap-door in its closed position. The spring *r* is not, however, powerful enough to retain the trap-door closed when the trap-door is mounted by the entrapped animal, and hence the animal when it has passed over the platform L, not being able to return, passes toward the outer end of the passageway and mounts the trap-door and then by its weight depresses and thereby opens the trap-door against the action of the spring and into a receptacle T arranged under the outlet 30 of the said passageway and drops through the said outlet into the said receptacle through an aperture 33 formed in the cover *t* with which the said receptacle is provided, as shown in Fig. 8.

My improved trap is provided with a shelf 34 on which the receptacle T is removably mounted, and the cover *t* is removable from the receptacle upon the removal of the latter from the said shelf. The receptacle T is supplied with a body of water *u* into which the entrapped animal drops upon its passage into the receptacle, as shown in Fig. 1, which body is preferably covered by a layer of oil *x* and deep enough to submerge the hind legs and rear portion of the body of the animal when the animal stands on its said legs as illustrated in Fig. 1.

What I claim is:—

1. In an animal-trap, a chamber having a doorway leading thereto, a door normally open and arranged below the doorway and movable upwardly to close the doorway, a vertically movable platform arranged within the chamber a suitable distance from the doorway and normally in its upper position and adapted to be lowered by the weight of the animal to be entrapped, a stationary platform extending under the travel of the movable platform from the lower end of the doorway, mechanism arranged below the stationary platform and operatively connected with the movable platform and with the door and operated to close the door during the descent of the movable platform, and means whereby the door is locked upon the actuation of the door into its closed position.

2. In an animal-trap, a chamber having a doorway leading thereto, a door normally open and movable to close the doorway, a vertically movable slide arranged within the chamber a suitable distance from the doorway and normally in its upper position, slideways for the slide, a stationary platform extending between the travel of the slide and the lower end of the doorway, mechanism establishing operative connection between the slide and the door, and a platform borne by the slide at the upper end of the slide and adapted to be lowered by the weight of the animal to be entrapped, and the relative arrangement of the parts being such that the descent of the movable platform results in the actuation of the door into its closed position.

3. In an animal-trap, a chamber having a doorway leading thereto, a door normally open and arranged below the doorway and movable upwardly to close the doorway, a vertically movable slide arranged within the chamber a suitable distance from the doorway and normally in its upper position, slideways for the slide, a platform borne by the slide at the upper end of the slide and adapted to be lowered by the weight of the animal to be entrapped, a stationary platform arranged under the travel of the movable platform and extending between the travel of the slide and the lower end of the doorway, mechanism arranged under the stationary platform and establishing operative connection between the slide and the door, and means whereby the door is locked upon the actuation of the door into its closed position, and the relative arrangement of the parts being such that the descent of the movable platform results in the ascent of the door into its closed position.

4. In an animal-trap, a chamber having two doorways leading thereto and formed in opposite walls respectively of the chamber, doors normally open and movable to close the doorways, a vertically movable slide arranged centrally between the doorways and normally in its upper position, slideways for the slide, two stationary platforms arranged at opposite sides respectively of the slide and extending between the lower end of opposite doorways respectively and the travel of the slide, mechanism establishing operative connection between the slide and the doors, and a platform borne by the slide at the upper end of the slide and normally far enough above the stationary platforms to permit its descent.

5. In an animal-trap, a chamber having two doorways leading thereto and formed in opposite walls respectively of the chamber, doors normally open and below the doorways and movable upwardly to close the doorways, a vertically movable slide arranged centrally between the doorways and normally in its upper position, slideways for the slide, two stationary platforms arranged at opposite sides respectively of the slide and extending between the lower end of opposite doorways respectively and the slide, mechanism establishing operative connection between the slide and the doors and arranged below the stationary platforms, a platform borne by the slide at the upper end of the slide and normally far enough above the stationary platforms to permit its descent, and means whereby the doors are locked upon their movement into their closed position.

6. In an animal-trap, a chamber having a doorway leading thereto, a door normally open but movable into position to close the doorway, a vertically movable platform arranged within the chamber a suitable distance from the doorway and normally in its upper position and adapted to be lowered by the weight of the animal to be entrapped, means whereby the descent of the platform results in the closing of the door, a passageway arranged to lead from the said platform in the lower position of the platform and forming an outlet for the aforesaid chamber, a door connected with the platform and closing the inner end of the said passageway in the upper position of the platform and open in the lower position of the platform, a normally depressible platform within the said passageway and normally projecting upwardly and toward the outer end of the passageway, means acting to retain the last-mentioned platform in its normal position but not powerful enough to retain the said platform in the said position when the said platform is mounted by the entrapped animal, means whereby the first-mentioned door is locked upon the movement of the said door into its closed position, and means whereby the said door-locking means is rendered inoperative during the actuation of the last-mentioned platform by the weight of the animal.

7. In an animal-trap, a chamber having a doorway leading thereto, a door normally open but movable into position to close the doorway, a vertically movable platform arranged within the chamber a suitable distance from the doorway and normally in its upper position and adapted to be lowered by the weight of the animal to be entrapped, means whereby the descent of the platform results in the closing of the door, a passageway arranged to lead from the said platform in the lower position of the platform and forming an outlet leading from the aforesaid chamber for the entrapped animal, a door connected with the platform and closing the inner end of the said passageway in the upper position of the platform and open in the lower position of the platform, a tilting platform arranged within and longitudinally of the said passageway and normally projecting upwardly and outwardly and arranged to be lowered, means acting to retain the tilting platform in its normal position but not powerful enough to retain the tilting platform in the said position when the said platform is mounted by the entrapped animal, means whereby the first-mentioned door is locked upon the movement of the said door into its closed position, and means whereby the said door-locking means is rendered inoperative during the actuation of the tilting platform by the weight of the animal.

8. In an animal-trap, a chamber having a doorway leading thereto, a door normally open and arranged below the said doorway and movable into position to close the doorway, a normally depressible platform arranged within the chamber a suitable distance from the doorway and adapted to be lowered by the weight of the animal to be entrapped, means whereby the descent of the platform results in the closing of the door, a passageway arranged to lead from the said platform in the lower position of the platform and forming an outlet leading from the aforesaid chamber, a door connected with the platform and obstructing communication through the said passageway in the upper position of the platform and open in the lower position of the platform, an oscillating shaft arranged externally of the aforesaid chamber and below and transversely of the said passageway, a tilting platform arranged within and longitudinally of the said passageway and attached to the shaft and normally projecting upwardly and outwardly, a spring acting to retain the tilting platform in its normal position but not powerful enough to retain the tilting platform in the said position when the said platform is mounted by the entrapped animal, means whereby the first-mentioned door is locked upon the movement of the said door into its closed position, and means whereby the said door-locking means is rendered inoperative during the oscillation of the shaft by the depression of the last-mentioned platform against the action of the aforesaid spring.

9. In an animal-trap, a chamber having a doorway leading thereto, a door normally open and arranged below the said doorway and movable into position to close the doorway and provided at its upper end with a laterally and downwardly projecting resilient member, a normally depressible platform arranged within the chamber a suitable distance from the doorway and adapted to be lowered by the weight of the animal to be entrapped, means whereby the descent of the platform results in the closing of the door, a passageway arranged to lead from the door, a passageway arranged to lead from the said platform in the lower position of the platform and forming an outlet for the aforesaid chamber, a door connected with the platform and obstructing communication through the said passageway in the upper position of the platform and open in the lower position of the platform, an oscillating shaft arranged externally of the aforesaid chamber and below and transversely of the said passageway and having an upwardly projecting arm, a member operatively connected with the said arm and projecting into the path of the aforesaid resilient member, a tilting platform arranged within and longitudinally of the said passageway and attached to the shaft and normally projecting upwardly and outwardly, and a spring acting to retain the tilting platform in its normal position but not powerful enough to retain the tilting platform in the said position when the said platform is mounted by the entrapped animal.

10. In an animal-trap, a receptacle, a passageway leading to the said receptacle and provided at the bottom with an outlet which is arranged to communicate with the receptacle, a tilting platform arranged within and longitudinally of the said passageway between the said outlet and the receiving end of the passageway and normally projecting upwardly and outwardly and thereby obstructing the said passageway to prevent movement of an entrapped animal from the said outlet to the receiving end of the passageway, means acting to retain the said platform in its normal position but not powerful enough to retain the platform in the said position when the platform is mounted by the animal, a trap-door normally obstructing communication through the aforesaid outlet and arranged to be opened downwardly by the weight of the animal, and means acting to retain the trap-door in its closed position but not powerful enough to retain the trap-door closed when the trap-door is mounted by the animal.

In testimony whereof, I sign the foregoing specification, in the presence of two witnesses.

JOHN A. PETRO.

Witnesses:
C. H. DORER,
VICTOR C. LYNCH.